US006315450B1

(12) United States Patent
Hipol et al.

(10) Patent No.: US 6,315,450 B1
(45) Date of Patent: Nov. 13, 2001

(54) DIAPHRAGM PRELOAD AIR BEARING

(75) Inventors: Philip J. Hipol, Oro Valley; David R. Hill, Tucson, both of AZ (US)

(73) Assignee: Etec Systems, Inc., Hayward, CA (US)

( * ) Notice: Subject to any disclaimer, the term of this patent is extended or adjusted under 35 U.S.C. 154(b) by 0 days.

(21) Appl. No.: 09/241,833

(22) Filed: Feb. 1, 1999

(51) Int. Cl.[7] .................................................. F16C 27/08
(52) U.S. Cl. ................................. 384/37; 384/12; 384/40
(58) Field of Search ............................... 384/12, 37, 38, 384/40

(56) References Cited

U.S. PATENT DOCUMENTS

| 3,597,020 | * | 8/1971 | Thomas ................................... 384/12 |
| 3,597,021 | * | 8/1971 | Thomas ................................... 384/12 |
| 3,744,858 | * | 7/1973 | Weichsel ................................. 384/12 |
| 3,758,175 | * | 9/1973 | Van Roojen ............................ 384/12 |
| 3,799,628 | * | 3/1974 | Van Gaasbeek et al. .............. 384/12 |
| 4,113,325 |   | 9/1978 | Miller ....................................... 308/9 |
| 4,191,385 |   | 3/1980 | Fox et al. ................................. 277/3 |
| 4,351,574 | * | 9/1982 | Furukawa et al. ................. 384/12 X |
| 4,378,134 | * | 3/1983 | Eddy ...................................... 384/12 |
| 4,643,590 | * | 2/1987 | Olasz ................................. 384/12 X |
| 4,719,705 | * | 1/1988 | Laganza et al. .................. 384/12 X |
| 4,802,774 |   | 2/1989 | Pesikov .................................. 384/12 |
| 4,882,847 |   | 11/1989 | Hemmelgarn et al. ................ 33/503 |
| 4,946,293 | * | 8/1990 | Helms .................................... 384/12 |
| 5,257,461 |   | 11/1993 | Raleigh et al. ........................ 33/503 |
| 5,648,690 |   | 7/1997 | Hinds .................................... 310/12 |

FOREIGN PATENT DOCUMENTS 2 397 266    6/1978   (FR) .

* cited by examiner

Primary Examiner—Charles A. Marmor
Assistant Examiner—Ha Ho
(74) Attorney, Agent, or Firm—Sughrue, Mion, Zinn, MacPeak & Seas

(57) ABSTRACT

A preload hydrostatic bearing includes a pad, a diaphragm and an adjustable member. The pad has a bearing structure, an inlet manifold, and a plurality of orifices. The orifices direct a fluid, such as air, from the inlet manifold toward the bearing surface. The diaphragm is mounted on the pad, and the adjustable member, which extends in an axial direction, is coupled proximate one end to a center portion of the diaphragm. The diaphragm transfers a preload in the axial direction to the adjustable member. This preload hydrostatic bearing has a high repeatability of performance, because a single diaphragm replaces prior art mechanical coupling devices, such as ball bearings, conical seats and spring washers, which undesirably are sources of friction and hysteresis.

23 Claims, 2 Drawing Sheets

DIAPHRAGM PRELOAD AIR BEARING

BACKGROUND OF THE INVENTION

1. Field of the Invention

The present invention relates to bearings. More particularly, the present invention relates to a preload hydrostatic bearing with a diaphragm for improved performance.

2. Description of the Related Art

X-Y stage systems are typically used in machine tools and other applications where two-dimensional precision movement is required to position an object supported on the stage. A typical X-Y stage system includes a pair of parallel-spaced guide rails and a stage with at least one fixed air bearing at one end and a corresponding preload air bearing at the other end. The fixed and preload air bearings ride along respective guide rails to move the stage therealong. The preload air bearing provides a constant force to the fixed air bearing and maintains a constant air gap or flying height in the fixed air bearing.

Because it is difficult for guide rails of stage systems to be perfectly uniform, a preload air bearing must compensate for variations in the guide rails, due to thermal growth or other causes, while providing a constant force to the fixed air bearing. Conventional air bearings utilize mechanical preload devices including combinations of ball bearings, conical bearing seats and spring washers, such as Belleville washers, to compensate for rail variations. Examples of these air bearings may be found in U.S. Pat. No. 4,191,385, issued Mar. 3, 1980 to Fox et al. and U.S. Pat. No. 4,882,847, issued Nov. 28, 1989 to Hemmelgarn et al. FIG. 1 illustrates one such prior art preload air bearing 100. Bearing 100 includes a pad 102 having a bearing surface 103. Pad 102 is coupled to a cap 104. Bearing pad 102 is made of a porous material, such as graphite. In the alternative, pad 102 may have a plurality of orifices formed therein. Cap 104 has an internal space for receiving a compressed gas, such as air, from an external source. The compressed gas flows through cap 104 and pad 102 to create an air film between bearing surface 103 and a rail surface (not shown) on which bearing 100 rides. A ball 106 which is received in a seat 144 supports bearing cap 104. A spring washer 148, or stack of spring washers, supports seat 144 and ball 106. Washer 148 is secured on a boss 150 at one end of a preload pin 146. The arrangement of ball 106, seat 144 and spring washer 148 allows bearing cap 104 and pad 102 to tilt and accommodate slight variations in the rail surface. The air film gap may be altered by adjusting the position of preload pin 146.

One problem with conventional air bearings, however, is their inability to supply a constant preload. A small change in the uniformity of the guide rails can significantly alter the amount of force developed in the bearing, changing the bearing flying height, which can cause instability and possibly derail the stage. These bearings are also less stiff, and the stage, therefore, is more prone to yaw. In addition, these mechanical preload devices generate a great deal of friction between the spring washers, conical bearing seat and ball bearing, which results in motion loss. Other associated problems include dynamic oscillations, such as pneumatic hammer instability, hysteresis and non-linearity.

One solution includes replacing the spring washers with an air cylinder, which would ensure a constant preload and eliminate the friction associated with the washers. This preload air bearing, however, still requires a ball bearing pivot, another source of friction, to compensate for any non-uniformity in the guide rails. In addition, such an air bearing may be difficult to implement due to packaging constraints. Thus, it would be advantageous to provide a preload hydrostatic bearing with a simple design that is capable of providing a constant force with minimum hysteresis to a fixed hydrostatic bearing despite variations in the guide rails.

SUMMARY OF THE INVENTION

The present invention addresses these problems by providing a preload hydrostatic bearing with a single diaphragm. The diaphragm replaces the various mechanical preload devices, such as a ball bearing, bearing seat and spring washers. The size and thickness of the diaphragm are optimized to minimize the axial and bending stiffnesses and to maximize the radial stiffness of the diaphragm. Because the diaphragm has low axial and bending stiffnesses, the diaphragm can accommodate variations in the surface of a guide rail while generating little or no friction, thereby improving the performance of the preload hydrostatic bearing.

In accordance with one aspect of the invention, a preload hydrostatic bearing includes a pad, a diaphragm and an adjustable member. The pad includes a bearing structure, an inlet manifold, and a plurality of orifices. The orifices direct a fluid or gas, such as air, from the inlet manifold toward the bearing surface. The diaphragm is mounted on the pad and includes a center portion. The adjustable member, which extends in an axial direction, is coupled proximate one end to the center portion of the diaphragm. The diaphragm transfers a preload in the axial direction to the member.

In accordance with another aspect of the invention, a hydrostatic bearing stage system includes a pair of guide rails and a stage movable therealong. The guide rails include a first rail and a second rail. The stage has a first end proximate the first rail and a second end proximate the second rail. The system further includes a first hydrostatic bearing mounted on the first end of the stage and a preload hydrostatic bearing mounted on the second end of the stage. The preload hydrostatic bearing is similar to that described above.

In accordance with still another aspect of the invention, a method of bearing a structure on a surface includes directing a pressurized fluid onto the surface from the structure and flexibly coupling an axial member by a diaphragm to the structure. The method further includes adjusting an effective length of the axial member. This adjusting sets an amount of preload applied to the structure to urge the structure towards the surface.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
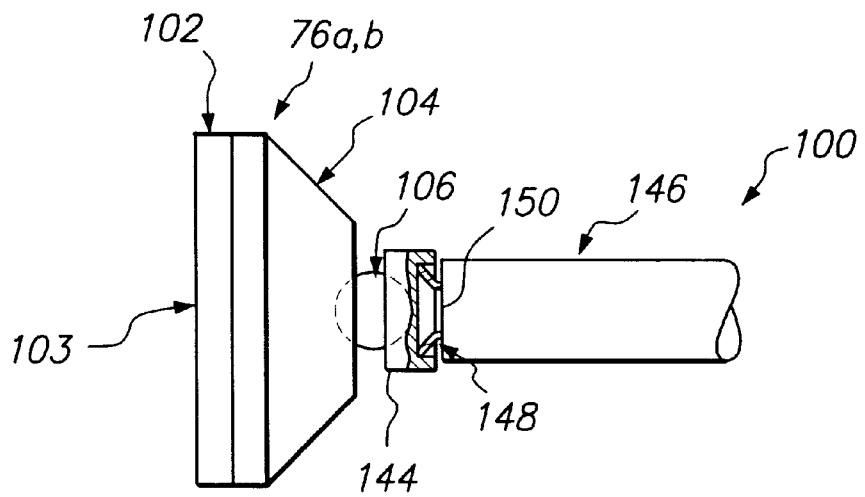
FIG. 1 is a front elevational view of a prior art preload air bearing.
Figure 2:
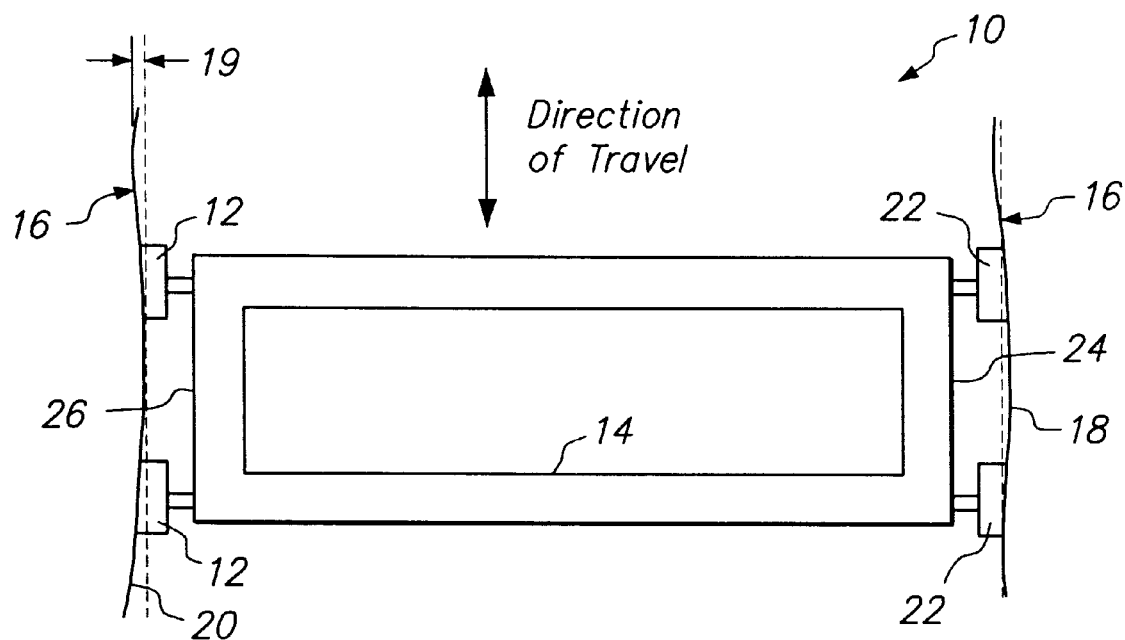
FIG. 2 is a schematic view of an X-Y stage system including a preload gas bearing in accordance with the present invention.

FIG. 2 illustrates a schematic view of an X-Y stage system 10 including a preload gas bearing 12 in accordance with the present invention. Stage system 10 includes a stage 14 which moves along a pair of guide rails 16 either vertically as noted in FIG. 2 or horizontally into and out of the page. Guide rails 16, which include a master rail 18 and a follower rail 20, are parallel-spaced with stage 14 disposed therebetween. Master rail 18 is machined to extremely high tolerances, such that it has fewer variations across its surface. Follower rail 20, however, for cost and manufacturing purposes, is machined to a lesser degree of precision than master rail 18 and, therefore, has a larger rail surface variation 19.

A pair of fixed gas bearings 22 are mounted on a first end 24 of stage 14. Fixed gas bearings 22 support stage 14 along master rail 18 of stage system 10. Preload gas bearings 12, corresponding to respective fixed gas bearings 22, are mounted on a second end 26 of stage 14, opposite first end 24, and support stage 14 along follower rail 20. Further details of such X-Y stage systems may be found in U.S. Pat. No. 4,882,847, issued Nov. 28, 1989 to Hemmelgarn et al. and U.S. Pat. No. 5,257,461, issued Nov. 2, 1993 to Raleigh et al., both of which are incorporated herein by reference. Preload gas bearings 12 provide a constant force to fixed gas bearings 22 to maintain stage 14 and fixed gas bearings 22 at a constant air gap or flying height with respect to the more uniform master rail 18. Although in the present embodiment bearings 12 and 22 are gas bearings, bearings 12 and 22 may also be other hydrostatic bearings employing fluids other than gas.

Figure 3:
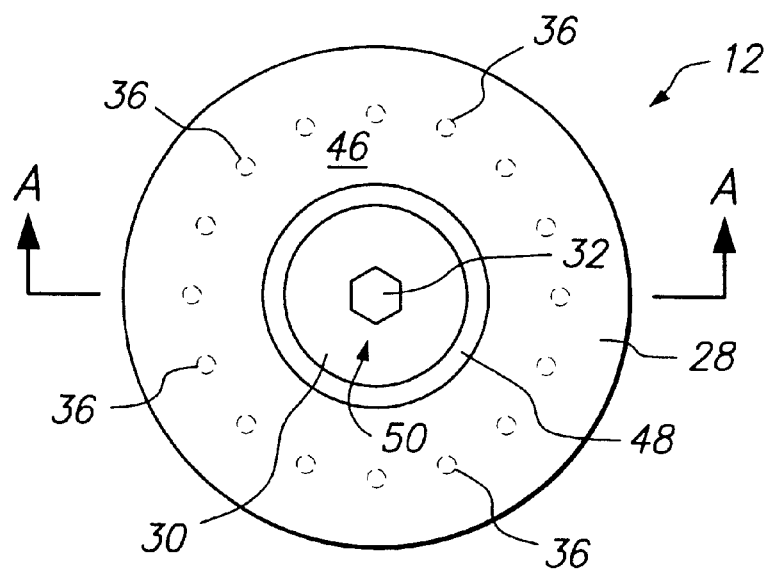
FIG. 3 is a top plan view of the preload gas bearing of FIG. 2.
Figure 4:
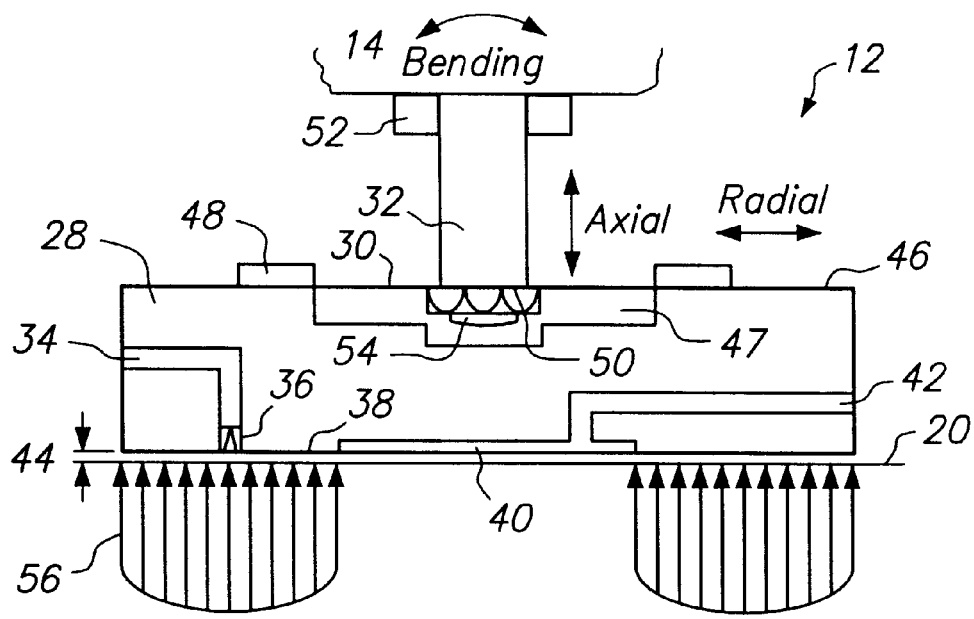
FIG. 4 is an enlarged cross-sectional view taken generally along the line A—A of FIG. 3 and including a portion of the stage and guide rail of the X-Y stage system of FIG. 2.

FIGS. 3 and 4 illustrate preload gas bearing 12 in greater detail. The main components of preload gas bearing 12 are a pad 28, a diaphragm 30 mounted to pad 28, and an adjustable screw (or equivalent adjustable member) 32, the length of which determines the amount of the preload. Pad 28 is generally cylindrical in configuration and is preferably made of a material such as an aluminum alloy or stainless steel. Pad 28 has an inlet manifold 34 and a plurality of orifices 36 formed therein. Orifices 36, as illustrated in FIG. 3, are disposed about pad 28 in a circle, however, any number and pattern of orifices may be formed in pad 28. Inlet manifold 34 and orifices 36 direct a compressed gas, such as air, from an external source (not shown) toward a bearing surface 38 of pad 28. Bearing surface 38 has a recess 40 formed therein at the center of surface 38. Recess 40 enables air at the center of pad 28 to escape to the atmosphere via an outlet passage 42. When air is introduced into inlet manifold 34 and orifices 36 of preload gas bearing 12, an air gap 44, on which bearing 12 rides, forms between bearing surface 38 and follower rail 20.

Diaphragm 30 is mounted on a top surface 46 of pad 28 over an opening 47 formed in top surface 46. A retaining ring 48 secures diaphragm 30 to pad 28. In the alternative, adhesives or other mechanical fasteners, such as screws or rivets, may be used to secure diaphragm 30 to pad 28. Diaphragm 30 is a thin, annular disk comprised of a flexible material. For example, diaphragm 30 may be made of stainless steel, beryllium copper or phosphor bronze. Diaphragm 30 has a design which minimizes the bearing's axial and bending stiffnesses while maximizing its radial stiffness. The low axial stiffness of diaphragm 30 enables preload gas bearing 12 to accommodate in the axial direction imperfections and projections along guide rails 16 with minor variations in the axial force transmitted by bearing 12. In direct contrast, in a diaphragm with a high axial stiffness, small rail variations will produce large variations in the axial force. The low bending stiffness of diaphragm 30 provides bearing 12 with a friction-free rotational degree of freedom. The high radial stiffness ensures that pad 28 remains concentric with screw 32. Thus, a single diaphragm 30 replaces the assembly of spring washers, bearing seat and ball bearing present in other air bearings, thereby eliminating various sources of friction and non-linearity in the system.

Screw 32 is coupled proximate one end to center portion 50 of diaphragm 30. Screw 32 provides the primary load path between pad 28 and stage 14. Screw 32 is affixed to stage 14 at the other end by a clamp 52. Mounted on one end of screw 32, opposite the end with clamp 52, is a resilient energy absorbing device 54. Energy absorbing device 54 prevents screw 32 from bottoming out on pad 28, thereby limiting the axial displacement of screw 32 with respect to pad 28. Energy absorbing device 54 may be made of any material, such as rubber, having a low durometer. As discussed above, the adjusted length of screw 32 extending from stage 14 determines the preload amount of gas bearing 12, and the length is fixed prior to the operation of bearing 12.

The dimensions of diaphragm 30 will vary depending upon the particular needs of the application. Factors which are considered in determining the dimensions of diaphragm 30 include the desired deflection of diaphragm 30, the preload to be applied to gas bearing 12, and the material, thickness and diameter of diaphragm 30. For example, a stainless steel diaphragm, 2 in. in diameter and 0.050 in. thick, has a stiffness of approximately 46,000 lbs/in. At a preload of 250 lbs., the diaphragm will undergo an axial displacement of approximately 0.005 in. A variation of 0.0005 in. in guide rails 16 will cause a 23 lbs. force variation in the axial direction. For an air bearing with a stiffness of 400,000 lbs./in., the 23 lbs. force variation will cause a 60 micro-inch change in the flying height of the gas bearing. The optimum design of preload gas bearing 12 balances the bending stiffness of diaphragm 30 with its membrane stiffness.

X-Y stage system 10 with preload gas bearing 12, therefore, operates as follows. First, prior to operation the preload of each gas bearing 12 is set by adjusting the axial length of screw 32. A compressed gas from an external source is then directed through preload gas bearings 12 and fixed gas bearings 22 to support stage 14 on guide rails 16. In each preload gas bearing 12, the compressed gas travels through inlet manifold 34 and orifices 36 to bearing surface 38 of pad 28. The compressed gas produces a distributed pressure load 56 (FIG. 4) on bearing surface 38. The combination of the inlet pressure of the compressed gas and the bearing preload produces air gap 44 between bearing surface 38 of pad 28 and follower rail 20. Compressed gas at the center of bearing surface 38 is vented to the atmosphere via recess 40 and outlet passage 42. The distributed pressure load 56 on bearing surface 38 creates a net axial force on pad 28. This axial force is transmitted through diaphragm 30 and screw 32 of preload air bearing 12, through stage 14 and to the respective fixed gas bearing 22. The axial force which preload gas bearings 12 apply to fixed gas bearings 22 preferably remains constant, thereby maintaining fixed gas bearings 22 at a constant flying height with respect to master rail 18. As stage 14 moves along guide rails 16, diaphragm 30 of preload gas bearings 12 flexes and readjusts, allowing preload gas bearings 12 to compensate for variations in the surface of follower rail 20 and to maintain the force on fixed gas bearings 22 substantially the same.

In summary, the diaphragm preload gas bearing of the present invention provides several advantages over prior art preload air bearings. The preload gas bearing has a simplified design, since a single diaphragm replaces the combination of a ball bearing, bearing seat and spring washers. This simplified design reduces both the parts and manufacturing costs for the gas bearing. In addition, because the bearing has only a diaphragm with no sliding interfaces, the bearing provides a significant reduction in friction for a stage system. The diaphragm preload gas bearing is more stable dynamically and reduces uncompensated stage yaw.

While the present invention has been described with reference to a specific embodiment, the description is illustrative of the invention and is not to be construed as limiting the invention. Various modifications may occur to those skilled in the art without departing from the true spirit and scope of the invention as defined by the appended claims.

What is claimed is:

1. A preload hydrostatic bearing comprising:
    a pad having a bearing surface, an inlet manifold, and a plurality of orifices for directing fluid towards the bearing surface;
    a diaphragm secured to the pad without the diaphragm contacting the fluid, the diaphragm having a center portion; and
    an adjustable member coupled proximate one end thereof to the center portion of the diaphragm, the member extending in an axial direction,
    wherein the diaphragm transfers a preload in the axial direction to the member.

2. The preload hydrostatic bearing of claim 1 wherein the amount of the preload is fixed by adjusting an effective length of the member.

3. The preload hydrostatic bearing of claim 1 wherein the diaphragm comprises a flexible material.

4. The preload hydrostatic bearing of claim 3 wherein the flexible material is stainless steel.

5. The preload hydrostatic bearing of claim 4 wherein the diaphragm has a diameter of approximately 2 inches and a thickness of approximately 0.05 inch.

6. The preload hydrostatic bearing of claim 3 wherein the flexible material is beryllium copper.

7. The preload hydrostatic bearing of claim 3 wherein the flexible material is phosphor bronze.

8. The preload hydrostatic bearing of claim 1 wherein the pad defines a recess therein for conducting fluid supplied through the plurality of orifices away from the bearing surface.

9. A preload hydrostatic bearing comprising:
    a pad having a bearing surface, an inlet manifold, and a plurality of orifices for directing fluid towards the bearing surface;
    a diaphragm secured to the pad, the diaphragm having a center portion; and
    an adjustable member coupled proximate one end thereof to the center portion of the diaphragm, the member extending in an axial direction,
    wherein the diaphragm transfers a preload in the axial direction to the member; and
    wherein the member includes an energy absorbing device mounted at the one end coupled to the center portion of the diaphragm, the energy absorbing device limiting axial displacement of the pad.

10. A hydrostatic bearing stage system comprising:
    a pair of guide rails including a first rail and a second rail spaced apart from the first rail;
    a stage disposed between and movable along the pair of guide rails, the stage having a first end proximate the first rail and a second end proximate the second rail;
    a first hydrostatic bearing mounted on the first end of the stage; and
    a preload hydrostatic bearing mounted on the second end of the stage, the preload hydrostatic bearing comprising:
        a pad having a bearing surface, an inlet manifold, and at least one orifice for directing fluid toward the bearing surface;
        a diaphragm secured to the pad without the diaphragm contacting the fluid, the diaphragm having a center portion; and
        an adjustable member extending in an axial direction and having a first end and a second end, the adjustable member coupled proximate the first end thereof to the center portion of the diaphragm and coupled at the second end thereof to the stage structure.

11. The system of claim 10 wherein the diaphragm of the preload hydrostatic bearing comprises a flexible material.

12. The system of claim 11 wherein the flexible material is stainless steel.

13. The system of claim 12 wherein the diaphragm of the preload hydrostatic bearing has a diameter of approximately 2 inches and a thickness of approximately 0.05 inch.

14. The system of claim 11 wherein the flexible material is beryllium copper.

15. The system of claim 11 wherein the flexible material is phosphor bronze.

16. The system of claim 10 wherein the pad of the preload hydrostatic bearing defines a recess therein for venting the fluid.

17. A hydrostatic bearing stage system comprising:
    a pair of guide rails including a first rail and a second rail spaced apart from the first rail;
    a stage disposed between and movable along the pair of guide rails, the stage having a first end proximate the first rail and a second end proximate the second rail;
    a first hydrostatic bearing mounted on the first end of the stage; and
    a preload hydrostatic bearing mounted on the second end of the stage, the preload hydrostatic bearing comprising:
        pad having a bearing surface, an inlet manifold, and at least one orifice for directing fluid toward the bearing surface;
        a diaphragm secured to the pad, the diaphragm having a center portion; and
        an adjustable member extending in an axial direction and having a first end and a second end, the member coupled proximate the first end thereof to the center portion of the diaphragm and coupled at the second end thereof to the stage structure,
    wherein the diaphragm transfers a preload in the axial direction through the member and the stage thereby to maintain a substantially constant gap between the first hydrostatic bearing and the first rail; and
    wherein the member of the preload hydrostatic bearing includes an energy absorbing device mounted to the first end, the energy absorbing device limiting a displacement of the pad with respect to the member.

18. A method of bearing a structure on a surface, said method comprising:
    directing a pressurized fluid onto the surface from the structure;

flexibly coupling an axial member by a diaphragm that is secured to the structure without the diaphragm contacting the fluid;

adjusting an effective length of the axial member, wherein the adjusting sets an amount of preload applied to the structure to urge the structure towards the surface.

19. The method of claim 18 wherein the diaphragm comprises a flexible material.

20. The method of claim 19 wherein the flexible material is stainless steel.

21. The method of claim 19 wherein the diaphragm has a diameter of approximately 2 inches and a thickness of approximately 0.05 inch.

22. The method of claim 19 wherein the flexible material is beryllium copper.

23. The method of claim 19 wherein the flexible material is phosphor bronze.

\* \* \* \* \*